Patented Dec. 1, 1942

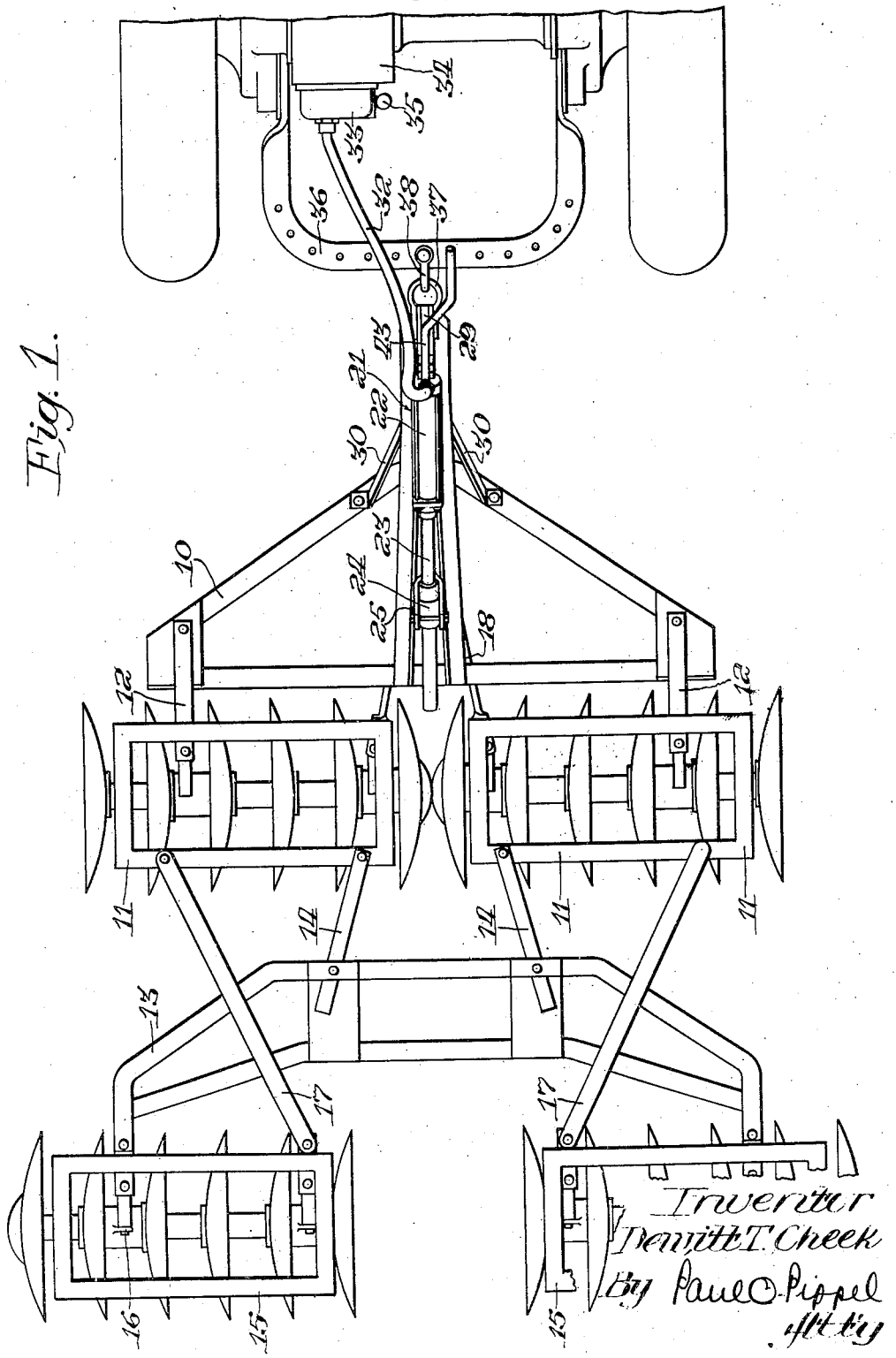

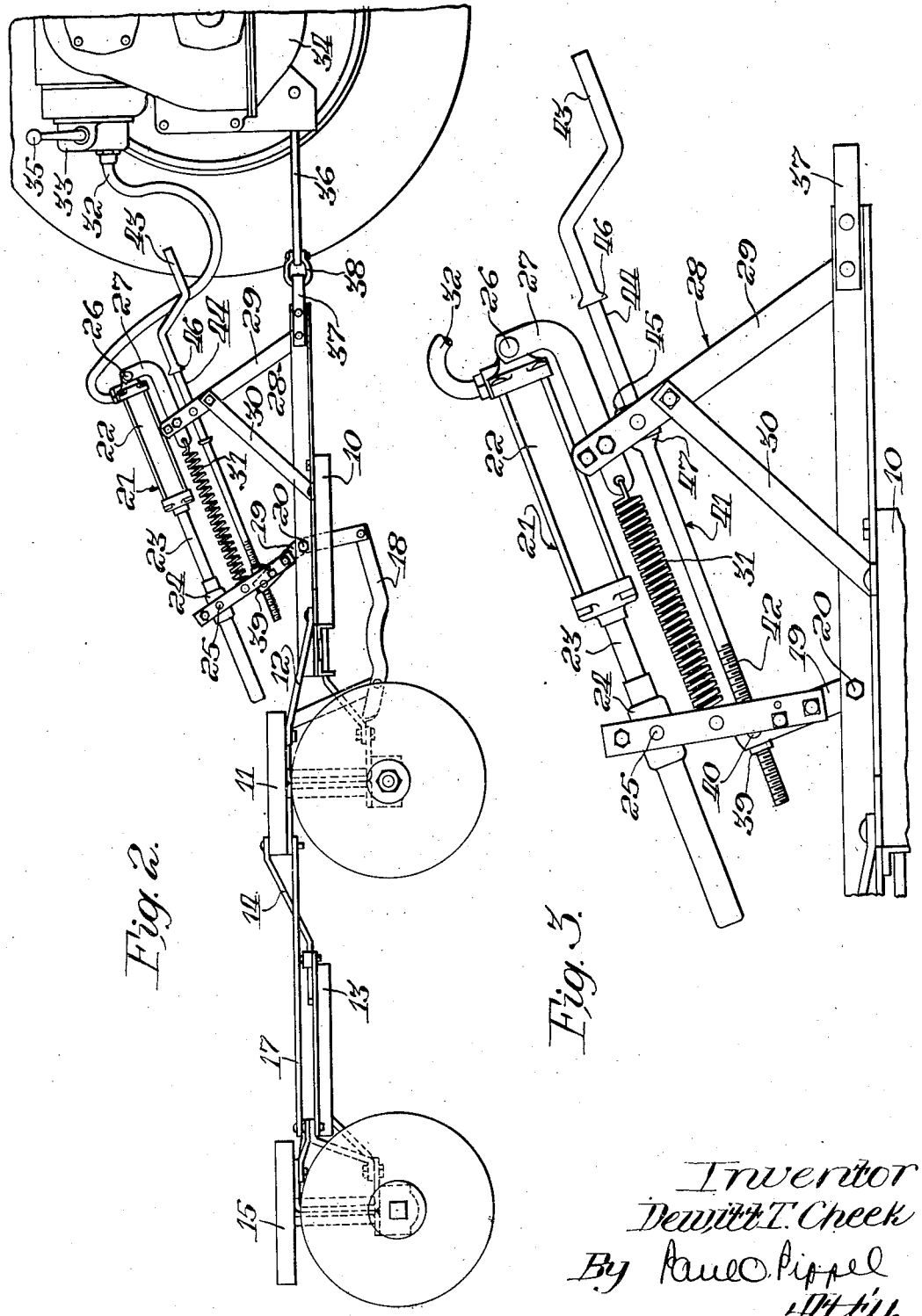

2,303,325

UNITED STATES PATENT OFFICE 2,303,325

HARROW CONTROLLED BY TRACTOR POWER

Dewitt T. Cheek, Little Rock, Ark., assignor to International Harvester Company, a corporation of New Jersey Application September 7, 1940, Serial No. 355,781

22 Claims. (Cl. 55—83)

This invention relates to a harrow controlled by tractor power. More specifically it relates to control of a disk harrow pulled by a tractor, by means of a fluid-power device mounted upon the harrow and having the tractor as its source of power.

The usual four-gang tandem disk harrow is so constructed that the gangs are angled to working position by means of draft power or a forward pull upon the harrow and are placed in straightened parallel position by backing of the harrow. Under many circumstances it is inconvenient to back the harrow for straightening, and, consequently, straightening of the harrow in some other way, such as by tractor power, becomes desirable.

An object of the present invention is to provide a harrow in which the gangs are shiftable by tractor power.

Another object is the provision of a harrow in which the gangs are shifted by means of a power device mounted on the harrow and receiving its power from a tractor pulling the harrow.

A further object is to provide means for shifting the gangs of a harrow from working position to transport position by tractor power.

A still further object is the provision of a harrow in which the gangs are moved to transport position by means of tractor power and to working position by draft power.

Other objects will be apparent to those skilled in the art as the disclosure is more fully made.

According to the present invention, a fluid-power device composed of a cylinder and a piston is mounted on a harrow connected at the rear of a tractor. The fluid-power device derives fluid under pressure from the tractor and is connected with the harrow so that, by application of power, it moves the gangs to transport position. Movement of the gangs to working position is effected by a forward pull upon the tractor aided by a spring. Adjustment of the working position of the gangs is effected by means of a rod having threaded engagement at one end with a nut and having a crank at the other end within easy reach of an operator on the tractor.

In the drawings:

Figure 1 is a plan view of the harrow of the present invention in transport position and the rear portion of a tractor to which the harrow is attached;

Figure 2 is a side view of the harrow and tractor shown in Figure 1; and,

Figure 3 is a side view of a portion of Figure 2, showing a fluid-power device for shifting the harrow gangs to transport position, the power device being in position for working position of the gangs.

As shown in Figure 1, the harrow of the present invention is like that shown in the patent to Mowry et al. No. 1,725,409,, August 20, 1929, and comprises essentially a front frame 10, front gangs 11 connected adjacent their outer ends to the frame 10 by means of links 12, a rear frame 13 connected to the inner ends of the front gangs 11 by means of links 14, and rear gangs 15 connected adjacent their outer ends, as at 16, to the frame 13 and to the outer ends of the front gangs 11 by means of links 17. The inner ends of the front gangs 11 are connected by means of links 18 to the lower end of a lever 19 pivoted, as at 20, to the front frame 10. The harrow as described thus far is identical with that shown in the Mowry et al. patent mentioned above. However, in the present invention the lever 19, through which change in the position of the gangs is effected, is connected to a fluid-power device 21. This power device comprises essentially a cylinder 22 and a piston, not shown, slidably mounted therein and secured to a rod 23 having an enlarged portion 24 pivotally connected at 25 to the upper end of the lever 19. One end of the cylinder 22 is secured, as at 26, to an L-shaped member 27 carried by a superstructure 28 formed of a pair of members 29 and braces 30 secured to the front frame 10.

A spring 31 connects the L-shaped member 27 and the upper end of the lever 19. The fluid-power device 21 is adapted to be operated by fluid under pressure supplied to the cylinder through a hose 32 connected to a suitable means 33 at the back of a tractor 34, which means is capable of supplying fluid under pressure through the action of the tractor engine, not shown. The means 33 has a control member 35 for regulating the supply of fluid under pressure. The harrow is pivotally connected at the rear of the tractor 34 to a U-shaped draw-bar 36 by means of a clevis 37 connected to the front frame 10 and a clip 38 connected to the draw-bar 36.

A threaded nut 39 is pivotally carried on the upper end of the lever 19 at a point 40 between the frame 10 and the rod extension 23 of the piston in the fluid-power device 21. A control rod 41 has a threaded end 42 in engagement with the nut 39 and has a crank portion 43 at the other end extending within easy reach of an operator on the tractor 34. The control rod 41 has an intermediate portion 44 slidably mounted in a collar 45 carried on the superstructure 28 and stop portions 46 and 47 which limit the lengthwise movement of the control rod in the collar 45.

Figures 1 and 2 show the harrow in transport position with the gangs parallel. In this position the piston is at the rear end of the cylinder 22, fluid under pressure having been supplied through the hose 32 to the cylinder 22 to move the piston to the rear of the cylinder. The control 35 is maintained in such position as to retain the piston at the rear of the cylinder, and, consequently the gangs are held in the parallel transport position even though the harrow is drawn. When it is desired to place the gangs in working position the control member 35 is actuated so as to release the fluid from the connecting line 32 and the cylinder 22, and the pull of the ground upon the gangs, aided by the spring 31, causes the gangs to move to working position in which the inner ends of the front gangs 11 and the outer ends of the rear gangs 15 extend to the rear. As a consequence, the lever 19 moves in a clockwise direction, as viewed in Figures 2 and 3, and moves the piston to the forward end of the cylinder 22. Rotation of the control rod 41 as desired brings an adjustment of the working position of the gangs, for the stop portion 47 on the control rod limits the movement of the lever 19 in a clockwise direction.

Normal operation of the harrow requires the working position with the parts as shown in Figure 3. When it becomes necessary to move the gangs to transport position, movement of the piston toward the rear end of the cylinder 22 causes a counterclockwise movement of the lever 19 and shifting of the gangs. Shifting of the gangs to transport position by means of power is of great advantage in the event that the ground is so soft that neither backing nor pulling forward of the harrow in working position is possible, and the harrow cannot be straightened by backing.

From the foregoing description it will be apparent that a new and novel means for adjustment of a harrow has been provided. While it is not new to employ a fluid-power device upon a harrow for shifting the gangs, the combination of the power device with an easily reached and easily operated control rod is new.

The invention is to be limited only within the scope of the appended claims.

What is claimed is:

1. In combination, a tractor having a power plant, a harrow connected at the rear of the tractor and including a gang, and means for shifting the gang comprising a power device mounted on the harrow and comprising a cylinder element and a piston mounted therein, and means connecting the tractor power plant and the power device for causing relative movement between the members thereof, and means for adjusting the limit of shifting of the gang comprising a threaded member, a rod having a threaded portion engaging the threaded member, and a crank portion within easy reach of an operator on the tractor.

2. In combination, a tractor having a power plant, a harrow connected at the rear of the tractor and including a gang, and means for shifting the gang comprising a power device mounted on the harrow and comprising a cylinder element and a piston mounted therein, and means connecting the tractor power plant and the power device for causing relative movement between the members thereof, and means for adjusting the limit of shifting of the gang including a control member extending to within easy reach of an operator on the tractor.

3. In combination, a tractor having a power plant, a harrow connected at the rear of the tractor and including a gang, and means for shifting the gang comprising a power device mounted on the harrow and comprising a cylinder element and a piston mounted therein, and means connecting the tractor power plant and the power device for causing relative movement between the members thereof, and means for adjusting the limit of shifting of the gang including a rotatable control member having a crank portion within easy reach of an operator on the tractor.

4. In combination, a tractor having a power plant, a harrow connected at the rear of the tractor and comprising a frame member and a gang member shiftable with respect thereto, means for shifting the gang member comprising a power device comprising a cylinder element and piston element mounted therein, means connecting the tractor power plant and the power device for causing relative movement between the elements thereof, means connecting one element with the frame member, means connecting the other element with the gang member, and means for adjusting the limit of shifting of the gang member including a rotatable control member having a crank portion within easy reach of an operator on the tractor.

5. In combination, a tractor having a power plant, a harrow connected at the rear of the tractor and comprising a frame member and a gang member shiftable with respect thereto, means for shifting the gang member comprising a power device comprising a cylinder element and piston element mounted therein, means connecting the tractor power plant and the power device for causing relative movement between the elements thereof, means connecting one element with the frame member, means connecting the other element with the gang member, and means for adjusting the limit of shifting of the gang member comprising a threaded member and a rotatable threaded control member engaging the threaded member and having a crank portion within reach of an operator on the tractor, one member being connected to one harrow member, the other member having a stop portion engageable with the other harrow member.

6. In combination, a tractor having a power plant, a harrow connected at the rear of the tractor and comprising a frame member and a gang member shiftable with respect thereto, means for shifting the gang member comprising a power device comprising a cylinder element and piston element mounted therein, means connecting the tractor power plant and the power device for causing relative movement between the elements thereof, means connecting one element with the frame member, means connecting the other element with the gang member, and means for adjusting the limit of shifting of the gang member comprising a threaded member and a rotatable threaded control member engaging the threaded member and having a crank portion within reach of an operator on the tractor, one member being connected to the gang member, the other member having a stop portion engageable with the frame member.

7. In combination, a tractor having a power plant, a harrow connected at the rear of the tractor and comprising a frame member and a gang member shiftable with respect thereto, means for shifting the gang member comprising a power device comprising a cylinder element and a piston element mounted therein, means connecting the tractor power plant and the power device for causing relative movement between the elements thereof, means connecting one element with the frame member, means connecting the other element with the gang member, and means for adjusting the limit of shifting of the gang member comprising a threaded member and a rotatable threaded control member engaging the threaded member and having a crank portion within reach of an operator on the tractor, the threaded control member having a stop portion engageable with one harrow member, the other threaded member being connected to the other harrow member.

8. In combination, a tractor having a power plant, a harrow connected at the rear of the tractor and comprising a frame member and a gang member shiftable with respect thereto, means for shifting the gang member comprising a power device comprising a cylinder element and piston element mounted therein, means connecting the tractor power plant and the power device for causing relative movement between the elements thereof, means connecting one element with the frame member, means connecting the other element with the gang member, and means for adjusting the limit of shifting of the gang member comprising a threaded member and a rotatable threaded control member engaging the threaded member and having a crank portion within reach of an operator on the tractor, the threaded control member having a stop portion engageable with the frame member, the other threaded member being connected with the gang member.

9. In combination, a tractor having a power plant, a harrow connected at the rear of the tractor and comprising a frame member and a gang member shiftable with respect thereto from a working position to a transport position, means for shifting the gang member from working position comprising a power device comprising a cylinder element and a piston element mounted therein, means connecting the tractor power plant and the power device for causing relative movement between the elements thereof, means connecting one element with the frame member, means connecting the other element with the gang member, and means for adjusting the working position of the gang member including a rotatable control member having a crank portion within easy reach of an operator on the tractor.

10. In combination, a tractor having a power plant, a harrow connected at the rear of the tractor and comprising a frame member and a gang member shiftable with respect thereto from a working position to a transport position, means for shifting the gang member from working position comprising a power device comprising a cylinder element and piston element mounted therein, means connecting the tractor power plant and the power device for causing relative movement between the elements thereof, means connecting one element with the frame member, means connecting the other element with the gang member, and means for adjusting the working position of the gang member comprising a threaded member connected with the gang member and a rotatable threaded control member engaging the other threaded member and having a stop portion engageable with the frame member and a crank portion within easy reach of an operator on the tractor.

11. In combination, a tractor having a power plant, a harrow connected at the rear of the tractor and comprising a frame member, a gang member positioned beneath the frame member and connected thereto and shiftable from working position to transport position, a lever pivoted at a mid-point on the frame member and connected at its lower end to the gang member, means for shifting the gang member from working position to transport position comprising a power device comprising a cylinder element and piston element mounted therein, means connecting the tractor power plant and the power device for causing relative movement between the elements thereof, means connecting one element with the frame member, means connecting the other element with the upper end of the lever, and means for adjusting the working position of the gang member comprising a threaded nut connected to the upper end of the lever and a control rod slidingly supported on the frame member and having a threaded portion in engagement with the nut, a stop portion engageable with the frame member, and a crank portion at one end within easy reach of an operator on the tractor.

12. In combination, a tractor having a power plant, a harrow connected at the rear of the tractor and comprising a frame, a superstructure on the frame, a gang positioned beneath the frame and connected thereto and shiftable from working position to transport position, and a lever pivoted at a mid-point on the frame and connected at its lower end to the gang, and means for shifting the gang from working position to transport position comprising a power device comprising a cylinder element and a piston element mounted therein, means connecting the tractor power plant and the power device for causing relative movement between the elements thereof, means connecting one element with the superstructure of the harrow frame, and means connecting the other element with the upper end of the lever, and means for adjusting the working position of the gang member comprising a threaded nut connected to the upper end of the lever and a control rod slidingly supported on the superstructure and having a stop portion engageable therewith, a threaded portion in engagement with the nut, and a crank portion within easy reach of the operator on the tractor.

13. In combination, a tractor having a power plant, a harrow connected at the rear thereof and comprising a frame, a superstructure on the frame, a gang positioned beneath the frame and angularly shiftable from working position to transport position, a lever pivoted at a mid-point on the frame and connected at its lower end to the gang, and means for shifting the gang from working position to transport position comprising a fluid-power device comprising a cylinder secured to the superstructure and a piston positioned within the cylinder and connected with the upper end of the lever and means connecting the fluid-power device and the tractor power plant so as to supply fluid under pressure to the device to move the piston within the cylinder, and means for adjusting the working angle of the harrow comprising a threaded nut connected to the upper end of the lever and a rod slidably supported on the superstructure and having a threaded portion engaging the nut, a stop portion engageable with the superstructure, and a crank portion within easy reach of an operator on the tractor.

14. In the combination specified in claim 13, the control rod being positioned between the fluid-power device and the harrow frame, the threaded nut on the lever being between the harrow frame and the connection of the piston with the lever.

15. The combination specified in claim 13, and further including spring means connecting the upper end of the lever and the superstructure on the harrow frame for urging the harrow gang into working position.

16. The combination specified in claim 13, and further including spring means connecting the upper end of the lever and the superstructure on the harrow frame for urging the harrow gang into working position, the control rod being positioned between the fluid-power device and the harrow frame, the threaded nut on the lever being between the harrow frame and the connection of the piston with the lever.

17. In combination, a harrow comprising a frame and a gang movable with respect thereto from transport position to working position, a fluid-power device mounted on the harrow for moving the gang from working position to transport position, and spring means for urging the gang from transport position to working position.

18. In combination, a tractor having a power plant, a harrow connected to the rear of the tractor and comprising a frame and a gang connected thereto for movement from transport position to working position, a fluid-power device mounted on the harrow for moving the gang from working position to transport position, means connecting the fluid-power device and the tractor power plant, and spring means for urging the gang from transport position to working position.

19. In combination, a tractor having a power plant, an implement connected in trail-behind relation to the tractor and comprising a working member and a member with respect to which the working member is adjustable for shifting between a working position and a transport position, means for shifting the working member, comprising a fluid-power device mounted on the implement, means connecting the tractor power plant and the fluid-power device for actuating the same, and means for adjusting the limit of shifting of the working member into working position including a control member extending to within easy reach of an operator on the tractor.

20. In combination, a tractor having a power plant, an implement connected in trail-behind relation to the tractor and comprising a working member and a member with respect to which the working member is adjustable for shifting between a working position and a transport position, means for shifting the working member, comprising a fluid-power device mounted on the implement, means connecting the tractor power plant and the fluid-power device for actuating the same, and means for adjusting the limit of shifting of the working member into working position including a control member rotatably mounted on the implement and having a crank portion within easy reach of an operator on the tractor.

21. In combination, a tractor having a power plant, an implement connected in trail-behind relation to the tractor and comprising a working member and a member with respect to which the working member is adjustable for shifting between a working position and a transport position, means for shifting the working member, comprising a fluid-power device mounted on the implement, means connecting the tractor power plant and the fluid-power device for actuating the same, and means for adjusting the limit of shifting of the working member comprising a threaded part and a rotatable threaded control part engaging the threaded part and having a crank portion within easy reach of an operator on the tractor, one part being connected to the working member, the other part having a stop portion engageable with the said other member.

22. In combination, a tractor having a power plant, an implement connected in trail-behind relation at the rear of the tractor comprising a frame and a member shiftable with respect to the frame for adjustment of the implement from working position to transport position, a first structure secured to the frame and extending thereabove, a second structure connected with the member and extending upwardly above the frame, a fluid-power device positioned above the frame and connecting the structures for shifting the part with respect to the frame for adjustment of the implement, means connecting the tractor power plant and the fluid-power device for actuating the same, and means for adjusting the limit of shifting of the member with respect to the frame for limiting the adjustment of the implement, said means comprising a threaded part and a rotatable threaded control part engaging the threaded part and having a crank portion within easy reach of an operator on the tractor, one part being connected with a point of one structure above the frame, the other part having a stop portion engageable with a point of the other structure above the frame.

DEWITT T. CHEEK.